(No Model.)
E. W. LYNCH.
NUT LOCK.
No. 578,063. Patented Mar. 2, 1897.
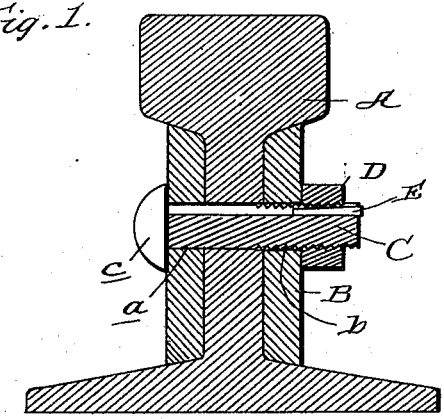
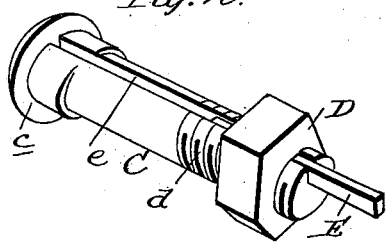
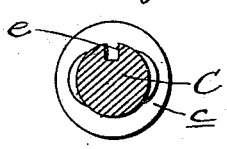 
Witnesses:
C. H. Raeder
W. A. James
Inventor
E. W. Lynch
By James J. Sheehy
Attorney

UNITED STATES PATENT OFFICE.

EDWARD W. LYNCH, OF BRAINERD, MINNESOTA.

NUT-LOCK.

SPECIFICATION forming part of Letters Patent No. 578,063, dated March 2, 1897.

Application filed February 10, 1896. Serial No. 578,702. (No model.)

*To all whom it may concern:*

Be it known that I, EDWARD W. LYNCH, a citizen of the United States, residing at Brainerd, in the county of Crow Wing and State of Minnesota, have invented certain new and useful Improvements in Nut-Locks; and I do declare the following to be a full, clear, and exact description of the invention, such as will enable others skilled in the art to which it appertains to make and use the same.

My invention relates to nut and bolt locks, and more particularly to thread and key locks, and has for one of its objects to provide a means of locking the nut on the bolt in such a manner that it will hold the nut in a rigid position thereon and at the same time prevent its removal therefrom unless tools such as are specially adapted for that or a similar purpose are used.

Another object of my invention is to provide effectual means for locking a nut on a bolt at but slight cost over the manufacture of the ordinary bolt and nut and without unnecessarily weakening the bolt.

A number of devices designed for securing the nut on the bolt by means of a key have been provided, none of which fully answer the purpose I have in view or fulfil the objects of my invention.

I accomplish the objects of my invention by forming a rectangular groove longitudinally of the bolt, beginning at the threaded end and continuing for a sufficient distance to receive a wedge-shaped or slightly-tapering key, also rectangular in cross-section and formed without a head or flange between the threaded interior of the nut and the bottom of the groove, the upper rectangular edges of the key being forced into the threads of the nut. The groove is extended far enough along the bolt to permit the key to be driven toward the head of the bolt and through the nut, thereby permitting the nut to be turned on the bolt.

Heretofore threaded bolts have been formed with grooves or channels and keys to be driven between the threaded interior of the nut fitted thereon, the key being provided with a feather-edge or rib which cuts into the threads on the nut. The distance the key can be driven has been limited either by the length of the groove or by the formation of a head, shoulder, or flange on the end of the key. In these devices the key is of the same thickness throughout the feathered or ribbed part and does not draw the lower interior of the nut on the side opposite the groove and key into rigid contact with the threads on the bolt.

A bolt has been provided with a groove throughout the length of its shank and also through the head thereon and furnished with a locking-key provided with a head or shoulder to rest against the outer face of the nut and with a feather-edge for a distance from the shoulder or head, the key being of the same diameter throughout the feathered part thereof, the inner end of the key terminating beyond the head of the bolt. In this latter construction the key lacks the wedge shape necessary to a rigid engagement between the interior of the nut and the bottom of the groove. In a nut and bolt lock of this kind the key may be readily started and removed from the groove by tapping the end which projects beyond the head of the bolt, and it is also necessary to provide bolts of different lengths with keys of corresponding lengths and extend the groove the entire distance, even though it should be several feet long, as are some bolts used in bridges, thereby not only greatly increasing their cost but weakening the bolt.

Still other nut and bolt locking devices have been designed, which consist of a V-shaped groove cut or formed through the threaded portion of the bolt, and a key provided with V-shaped edges is driven between the interior of the nut thereon and the bottom of the groove, the sharp edge of the key cutting into the threads on the nut. In other devices a groove has been cut in the threaded part of the bolt and also a channel in the threaded interior of the nut and a wedge-key driven therein; but in order to drive the key in place it is necessary that the groove in the bolt and the channel in the nut coincide, and this requirement prevents an accurate adjustment of the nut on the bolt. The key in the latter class of devices projects from the end of the bolt and may be readily seized with pincers or tongs and drawn from its recess, and unless the end of the key does project it cannot be withdrawn for adjusting or removing the nut. It is obvious that in the described class of nut-locks the means of rigidly securing the nut are very much limited by reason of the limited distance the head or the outer end of the key may be driven. My construction is designed to allow the key or wedge to be driven through the nut, not to be pulled out, and such being the fact the key or wedge may be driven in so tightly that great force would not turn the nut on the bolt.

Figure 1 is a transverse section taken through a railway-rail and fish-plates on opposite sides of the same and illustrating my improvements in operation. Fig. 2 is an enlarged perspective view illustrating the bolt, the nut, and the key for locking the nut on the bolt. Fig. 3 is a transverse section of the bolt, taken at the inside of the head; and Fig. 4 is a perspective view of the locking-key removed.

In the said drawings similar letters designate corresponding parts in all of the views, referring to which—

A indicates a railway-rail of the ordinary construction having a transverse aperture $a$. B indicates fish-plates arranged on opposite sides of the web of the rail and provided with transverse apertures $b$ in alinement with the aperture $a$ of the rail, and C indicates the bolt of my improvements. This bolt C has a head $c$ at one end and is threaded for a portion of its length, as indicated by $d$, and it is provided with the longitudinal groove $e$, which extends from the head $c$ to the opposite end of the bolt, as shown in Figs. 1 and 2, for reasons which will presently appear.

D indicates an interiorly-threaded nut which may be of the ordinary construction and is designed to be turned on the threaded portion of the bolt C, and E indicates the locking-key, which is preferably of a rectangular form in cross-section and is tapered toward one end, as better shown in Fig. 4. This key E, when the nut D has been turned to the desired position upon the bolt C, is inserted in the outer end of the groove $e$ of the bolt and is driven between the nut D and the bottom of the groove to about the position illustrated in Fig. 1, when it will be held against casual displacement and will serve effectually to lock the nut D against rotation in a direction to remove it from the bolt.

In virtue of the groove $e$ extending from the inner side of the head $c$ to the opposite end of the bolt, as shown and before described, it will be seen that the groove $e$ may be rolled in the bolt at the time of manufacture, which is a much cheaper way of forming the groove than by the swaging process, which is necessary when the groove extends but a portion of the length of the bolt. The groove $e$, extending from the head $c$ to the opposite end of the bolt, is also advantageous for the reason that when the nut D is at the inner end of the threaded portion $d$ the key E may be driven still farther inward, so as to securely lock the nut against rotation in a direction to remove it from the bolt. Again, it will be seen that while the groove $e$ contributes toward preventing casual removal of the nut in any position from the bolt it assists in the removal of both key and nut when such removal is desired. For instance, when it is desired for any reason to remove the nut from the bolt it is simply necessary to cut the key flush with the outer side of the nut and then with a hammer and any suitable instrument drive the key clear through the nut toward the head of the bolt. The groove extending the full length of the bolt permits of the key being thus removed, and when it is so removed the nut may be removed and afterward replaced on the bolt and may be locked in position by a new key driven between it and the bottom of the groove $e$ in the manner before described.

My improved nut and bolt lock has been illustrated and described in connection with a railroad-rail and the fish-plates used to overlap the ends of the rails and be bolted thereto, but it is obvious that the same locking device is alike applicable to bolts and nuts and to rods and nuts used in any structure or device. In case it is used on longer bolts than are shown in the drawings or on long rods the groove need only be formed a sufficient distance beyond the thread of the bolt to permit the wedge to be driven through the nut when it is desired to adjust the nut or remove it from the bolt.

Having thus described my invention, what I claim as new, and desire to secure by Letters Patent, is—

In a nut and bolt lock, the combination with a rectangular groove formed longitudinally in said bolt from the beginning of the threaded end to a distance beyond the threads thereon, of a rectangular tapering key adapted to be inserted in said groove between the nut and said bolt and rest in said groove, the rectangular corners of the upper face of said key adapted to cut into the threads on said nut and the face of the key to meet in rigid contact with said threads, substantially as shown and described.

In testimony whereof I affix my signature in presence of two witnesses.

EDWARD W. LYNCH.

Witnesses:
A. P. RIGGS,
A. L. HOFFMAN.